Jan. 1, 1952     S. P. NEMETH     2,580,944
KINETIC ENERGY COASTER FOR BICYCLES
Filed May 24, 1949
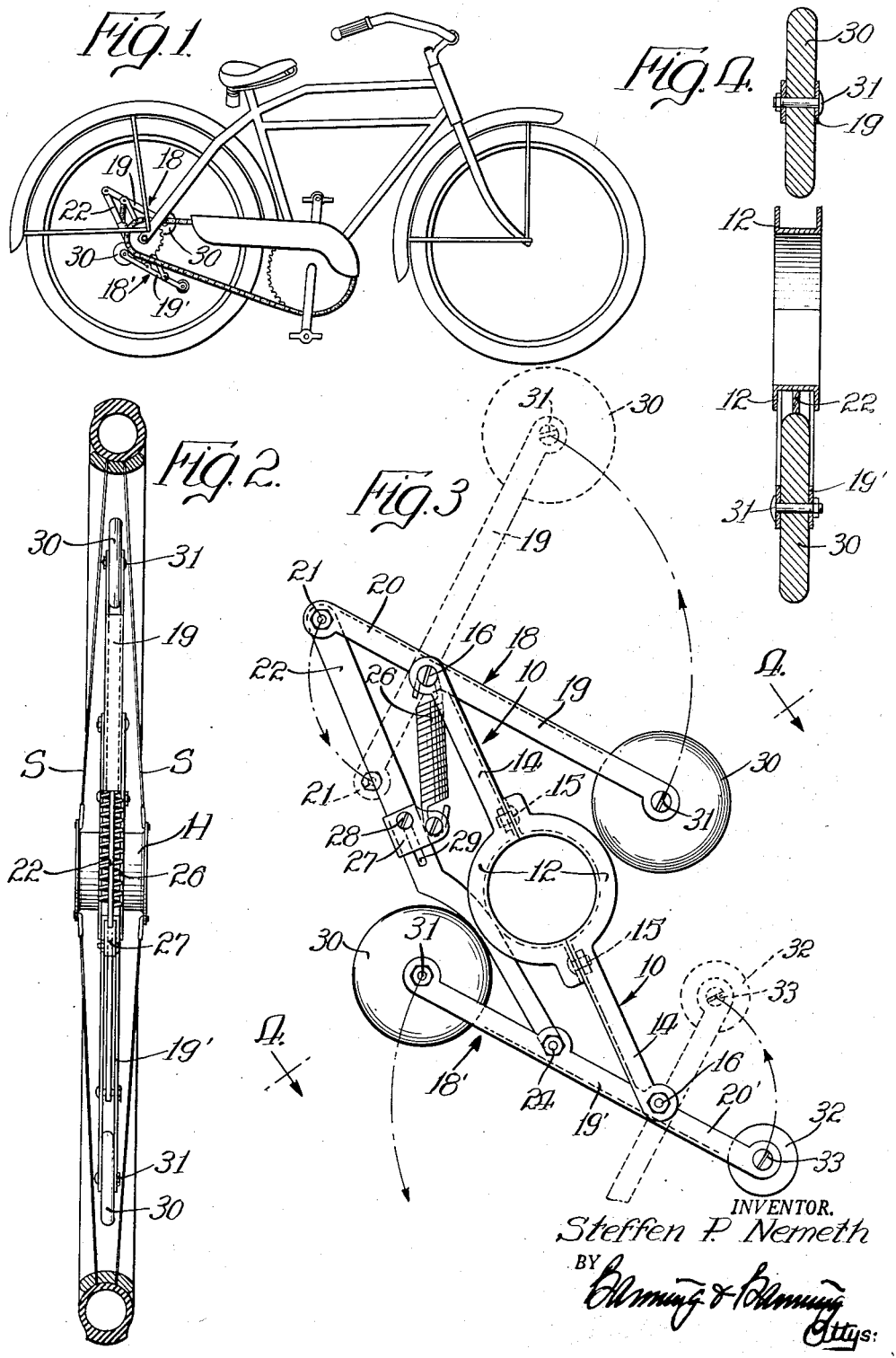
INVENTOR.
Steffen P. Nemeth Patented Jan. 1, 1952

2,580,944

UNITED STATES PATENT OFFICE 2,580,944

KINETIC ENERGY COASTER FOR BICYCLES

Steffen P. Nemeth, Chicago, Ill.

Application May 24, 1949, Serial No. 95,119

3 Claims. (Cl. 74—572)

This invention has to do with a kinetic energy coaster for bicycles, operative while the bicycle is being accelerated to store energy and thereafter to utilize the stored energy to propel the bicycle, thereby greatly increasing its potential coasting distance.

It has heretofore been proposed to increase the potential coasting distance of a bicycle by adding a flywheel or the equivalent thereof in the form of heavy wheel rims; but that expedient has a serious drawback in that it greatly increases the effort required to start the bicycle and to accelerate at low speed, thus more than offsetting the advantage to be gained from the increased coasting which is to be had following attainment of an effective speed of the bicycle.

In the case of a foot-propelled bicycle, a maximum of physical effort is required to accelerate from zero to the desired running speed, after which a lesser effort is needed to keep the bicycle in motion at a constant speed. Obviously, any device or attachment which noticeably increases the effort required to be put forth in order to accelerate from zero to an ordinary riding speed would not long meet with favor. On the other hand, when a bicycle has once attained an ordinary running speed, the extra coasting distance that is then available upon deceleration is a factor much to be desired, particularly when an upgrade is then encountered.

My primary object is to provide a coasting attachment which does not add noticeably to the effort required to accelerate a bicycle from zero to ordinary riding speed, and which thereafter maintains the stored energy ready for release, all without further effort on the part of the rider; when released, this stored energy will maintain the bicycle in motion for a greatly increased distance—as much as twice that which would be the case were the coasting attachment removed.

Another object of my invention is to provide a coasting attachment which can easily and quickly be attached to either wheel of any conventional bicycle, which involves a minimum of overall weight in its construction, and which will not produce any noticeable imbalance of the wheel to which it is attached.

An additional object of my invention is to provide a kinetic energy coaster which can be manufactured economically and is thus capable of being sold at an attractive price, but which nevertheless is adequately sturdy and durable to remain serviceable over a prolonged period.

Broadly, my invention is characterized by the inclusion of a plurality of weights symmetrically disposed about and supported by the hub of a bicycle wheel, and movable radially under centrifugal force while revolving in an orbit concentric with the axis of rotation of the wheel. The weights are spring-retracted toward the axis of the wheel so that their radii of gyration are small when the bicycle is at rest or moving at slow speed, and the magnitude or mass of the weights is low enough so that the resultant inertia is small at low speed. As the speed of rotation of the wheel increases, the weights move outwardly under the impetus of centrifugal force, thus increasing their radii of gyration and lineal speed. This, of course, increases the inertia while storing up kinetic energy and demands, in theory at least, a somewhat greater effort in order to achieve further acceleration than would otherwise be required; but the added effort is needed chiefly after the bicycle has attained a substantial speed, when minimum effort would normally be required. Thus, it will become apparent, as the ensuing detailed description progresses, that the present attachment is one capable of affording a great deal of pleasure in the form of increased coasting distance without demanding from the rider any noticeable amount of added effort.

What I presently consider to be the preferred embodiment of this invention is illustrated in the accompanying drawing, wherein:

Figure 1 is a side elevation of a conventional bicycle to the rear wheel of which is attached a kinetic energy coaster in accordance with the invention;

Fig. 2 is an enlarged transverse section through the rear wheel of the bicycle, showing the coasting attachment with its weights in the outwardly extended positions which they assume at high speed;

Fig. 3 is an elevational view of the device per se with its parts in the position which they assume when at rest; and Fig. 4 is a somewhat enlarged section, taken at line 4—4 of Fig. 3.

The device illustrated includes a supporting member comprising two identical parts 10, 10 made, preferably, of relatively thin sheet metal and having a channel or U-shaped cross-section, as most clearly shown in Fig. 4. Each part 10 consists of a semi-circular portion 12 and an arm 14. The two semi-circular portions 12 are designed to fit in between the two sets of spaced spokes S to embrace the hub H of the bicycle wheel and to tightly grip the same, conjointly, being secured together by bolts 15. The arms 14 extend radially and oppositely from the bicycle hub and the outer end of each is pivotally connected at 16, through the medium of a suitable bolt, to a lever 18 or 18' each comprising a relatively long arm 19 or 19' and a relatively short arm 20 or 20'.

The free end of the short arm 20 is pivotally connected, at 21, by means of a suitable bolt or pin to one end of a link 22 the other end of which is pivotally connected at 24 to the long arm 19' of the lever 18'. It will be seen that the two parts 10, 10 of the supporting member form with the short arm 20, link 22, and a portion of the arm 19', a non-rigid parallelogram.

A tension spring 26 has one end anchored to the bolt which forms the pivot 16 while its other end is attached to a plate 27 which, in turn, is secured to the link 22 by means of a bolt 28 passing through an elongated slot 29 formed in the link. The tension exerted by the spring 26 can be adjusted by moving the plate 27 lengthwise of the link 22, provided, of course, that the bolt 28 be loosened and afterward retightened.

Two circular disc weights 30, preferably identical, are attached, respectively, as by bolts 31, to the outer ends of the lever arms 19 and 19'; and a third but smaller disc weight 32 is attached, as by a bolt 33, to the outer end of the arm 20'. The purpose of the latter is to counterbalance the weight of the link 22 and spring 26. The tension exerted by the spring 26 normally biases the parallelogram structure in the direction such as to cause the weights 30 to be drawn inwardly toward the hub of the bicycle, as shown in full lines in Fig. 3; and such is the condition which obtains when the bicycle is at rest.

The radius of gyration of each of the two disc weights 30 is small at zero speed and remains small, though increasing to some extent while the speed of the bicycle continues low. But as the bicycle speed increases, centrifugal force overcomes the retractive force of the spring 26 and thereafter causes the weights 30 to move outwardly, thus markedly increasing their radii of gyration and lineal speed. This, obviously, increases the inertia operating against further acceleration, and in theory, at least, an increased effort should be required to build up any further speed. The weights used, however, need not be heavy, and the top speed is usually not great; consequently the additional power effort required for propulsion of the bicycle has proven not to be objectionable; in fact, many persons testing a bicycle equipped with the present coasting attachment have been unable to detect any difference at all in the power effort required.

It goes without saying that the kinetic energy stored in the revolving weights is added to that of the bicycle as a whole and thus increases the coasting distance. The heavier the weights 30 the greater will be the coasting distance, assuming equal conditions, and further assuming that a given speed has been attained in each instance. Bearing in mind that increasing the magnitude of the weights must correspondingly increase the required effort, while correspondingly increasing the potential coasting distance, determination of the amount of weight to be employed is a matter to be decided by experience. I have found as a result of numerous trials that weights of the order of two pounds each will bring about a very substantial increase of potential coasting distance without appreciably adding to the effort required to propel the bicycle at its usual speed.

In order to minimize the aggregate weight of a bicycle so equipped, it is preferable that all parts of the device, other than the weights themselves, be made as light as possible, consistently with adequate strength and rigidity.

It is feasible and within the scope and spirit of my invention to mount the weights 30 so that they are mutually independent; for example by eliminating the link 22 and providing separate springs for retracting the two weights. But such an alternative is less desirable than the arrangement illustrated because a more precise balance is required to maintain the radii of gyration of the weights exactly equal. Any inequality would cause the radius of gyration of one weight to exceed that of the other, and since both are necessarily traveling at the same rotative speed, the unequal radii would result in even further imbalance because of the greater centrifugal force exerted by the weight traveling in the orbit most remote from the center of revolution. While such a condition will not render the device inoperative or impracticable, it is objectionable, nevertheless, for the same reason that an unbalanced wheel is normally objectionable.

I claim:

1. A kinetic energy device for attachment to a bicycle wheel comprising a supporting member provided with means for attaching it to the hub of the wheel and having two arms arranged to extend oppositely and radially from the hub, a pair of levers each fulcrumed to one of the arms at points diametrically opposite and equally spaced from the center of rotation of the member, the levers each comprising a long arm and a short arm extending oppositely from the fulcrum thereof, a single link pivotally connected at one end to the free end of the short arm of one of the levers and pivotally connected at its other end to the long arm of the other lever, the link serving to maintain the levers mutually parallel continuously, a pair of equal weights attached to the long arms, individually, at points remote from the fulcrums of their respective levers, a single tension spring connected with the link and biasing the weights toward the center of rotation, and a counterweight carried by the other short lever arm and counterbalancing the weight of the link and the spring.

2. A kinetic energy device for attachment to a bicycle wheel comprising a supporting member provided with means for attaching it to the hub of the wheel and having two arms arranged to extend oppositely and radially from the hub, a pair of levers each fulcrumed to one of the arms at points diametrically opposite and equally spaced from the center of rotation of the member, the levers each comprising a long arm and a short arm extending oppositely from the fulcrum thereof, a single link pivotally connected at one end to the free end of the short arm of one of the levers and pivotally connected at its other end to the long arm of the other lever, the link serving to maintain the levers mutually parallel continuously, a pair of equal weights attached to the long arms, individually, at points remote from the fulcrums of their respective levers, a single tension spring connected at one end to one of the arms of said supporting member and at its other end to the link intermediately of the ends thereof and biasing the weights toward the center of rotation, and a counter-weight carried by the other short lever arm and counter-balancing the weight of the link and the spring.

3. A kinetic energy device for attachment to a bicycle wheel comprising a supporting member provided with means for attaching it to the hub of the wheel and having two arms arranged to extend oppositely and radially from the hub, a pair of levers each fulcrumed to one of the arms at points diametrically opposite and equally spaced from the center of rotation of the member, the levers each comprising a long arm and a short arm extending oppositely from the fulcrum thereof, a single link pivotally connected at one end to the free end of the short arm of one of the levers and pivotally connected at its other end to the long arm of the other lever, the link serving to maintain the levers mutually parallel continuously, a pair of equal weights attached to the long arms, individually, at points remote from the fulcrums of their respective levers, an adjustable plate mounted on the ink intermediately of the ends thereof, and a single tension spring connected at one end to said plate and at the other end to one of the radial arms of said supporting member, and a counter-weight carried by the other short lever arm and counter-balancing the weight of the link and the spring.

STEFFEN P. NEMETH.

REFERENCES CITED

The following references are of record in the file of this patent:

UNITED STATES PATENTS

| Number | Name | Date |
|---|---|---|
| 301,720 | Ide | July 8, 1884 |
| 445,452 | Murray | Jan. 27, 1891 |
| 511,839 | Ford | Jan. 2, 1894 |
| 1,995,010 | Quinn | Mar. 19, 1935 |

FOREIGN PATENTS

| Number | Country | Date |
|---|---|---|
| 527 | Great Britain | 1860 |
| 621 | Great Britain | 1879 |